Dec. 19, 1933.  J. L. SPENCE, JR  1,940,232
FILM FEED FOR MOVING PICTURE CAMERAS
Filed Oct. 19, 1929
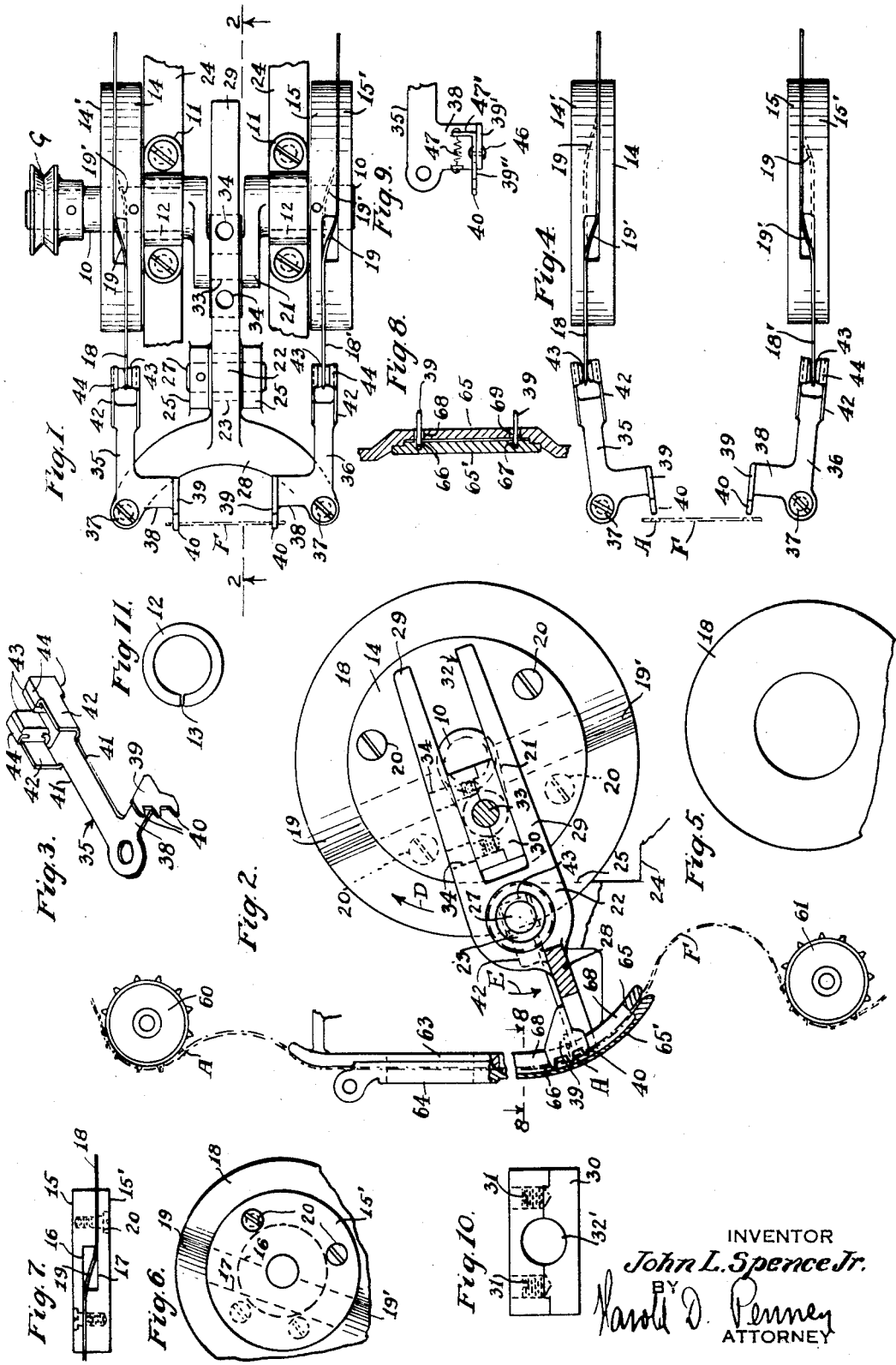
INVENTOR
John L. Spence Jr.
BY
Harold D. Penney
ATTORNEY Patented Dec. 19, 1933

1,940,232

UNITED STATES PATENT OFFICE 1,940,232

FILM FEED FOR MOVING PICTURE CAMERAS

John Livingston Spence, Jr., New York, N. Y., assignor, by mesne assignments, to Remac Patents Corporation, New York, N. Y., a corporation of New York Application October 19, 1929. Serial No. 400,827

8 Claims. (Cl. 88—18.4)

My present invention relates to an improvement in film feeding devices for motion picture machines, especially cameras, and has for its principal object, the provision of a film feed mechanism which will be noiseless in operation. In the taking, of such pictures, this factor becomes one of paramount importance due to the present trend in popularity of the so-called talking-moving pictures, and has obvious advantages, especially, in the taking and recording of such pictures.

A further advantage in the present device lies in the novel form of a dual action mechanism, in which a reciprocatory film engaging device is entered into and withdrawn from the sprocket holes of the film by two timed, simultaneously coacting means, operated from a single drive means.

Another advantage resides in the provision of means whereby the time cycle of the alternating feed motion of the herein device provides for a minimum shutter action of about 230 degrees opening whereas present practice and structures allows for a shutter action of only from 120 to 170 degrees opening. Thus the degree of efficiency of the present device is approximately fifty per cent more efficient than present practice.

The present device, therefore provides for meeting modern requirements of greater shutter opening and consequent efficiency, as well as noiselessness, as it is required, because of requirements in the production of sound pictures, that a maximum amount of light will reach the film, and sound picture production requires greatly increased speed in pictures per second, over past practice. This increase has amounted to as much as fifty per cent over old practice.

Further advantages lie in the various details of structure, as will be more specifically outlined hereafter, and it is obvious that modifications may be made in the details hereof without departing from the spirit of the herein disclosure nor the scope of the claims.

In the drawing,

Fig. 1 is a fragmental plan view of the feed-mechanism, showing the complete mechanism, with parts only of the associate camera;

Fig. 2 is an elevation of the feed mechanism taken on the line 2—2 of Fig. 1, looking in the direction of the arrows, the gate being broken and sectioned for convenience, showing the film being drawn down through the gate of the camera;

Fig. 3 is a perspective view of one of the film engaging claw members;

Fig. 4 is a plan view of the film engaging claws and their cam actuating means, isolated from some of their cooperative means, for better understanding;

Fig. 5 is a view of one of the circular film feed actuating cam discs;

Fig. 6 is an elevational view of the cam assembly, partly broken away;

Fig. 7 is a plan view of the joint cam assembly, showing the method of clamping the cam between two holding members, in timed operative assembly;

Fig. 8 is a sectional view of the film guides, taken on the line 8—8 of Fig. 2, looking in the direction of the arrows;

Fig. 9 is a fragmental view of a modified film feeding claw member, showing the teeth mounted for reciprocal movement and resiliently held by a spring to the oscillating feed arm;

Fig. 10 is a view of the fibre or non-metallic crank arm slide block showing the adjusting means to reduce noise and correct for wear; and Fig. 11 is a view of one of the split adjustable fibre or non-metallic bushings for the main bearings.

In the present drawing only such parts of the associate mechanism of a camera are shown as is necessary for understanding the operation of the herein device.

Referring to Fig. 1, wherein is shown a crank shaft 10, substantially mounted for noiseless operation in capped frame mounted brackets 11, which are bushed with a non-conducting sound proof material 12, such as fibre or the like and are split as 13, Fig. 11 to allow of adjusting to the shaft 10 by tightening of the caps of the said brackets 11.

Adjacent each bracket 11 and securely fastened to the shaft 10, are mounted a pair of opposed cam clamping members 14 and 15, as shown in Fig. 1 and more clearly shown in Figs. 6 and 7.

The said members have their adjacent face portions so cut away, or stepped, as 16 and 17, Figs. 6 and 7 as to cause the thin, bored, metal feed actuating disc cams 18 and 18' to be bent, when clamped therein, as at 19 and 19' thereby forming two offset cam clamping surfaces when the clamping members 14 and 14' and 15 and 15' are drawn together by the screws 20, with the feed actuating discs therebetween. If desired, the feed actuating discs 19 may be performed to the offset cam contours, before mounting in assembly.

Located between the bearing brackets 11 is a crank 21, which is integral with shaft 10 and which is adapted to noiselessly operate a reciprocatory feed member such as the rocker arm 22.

The rocker arm 22, is bored at its fulcrum point, to receive therein a pivoting pin 27, which in turn is supported by two opposed, spaced supporting brackets 25—25, which are suitably mounted to a frame base 24, Fig. 2. The rearwardly extending portion of the arm 22 is slotted to an open outer end, thus forming two opposed, parallel guideway levers 29—32, the inner surfaces of which are carefully machined to form a parallel slideway in which is slidably mounted a pivot slide block 30, made of a suitable noiseless, non-metallic material, such as fibre, this block being shown in position in Fig. 2, and in side detail, enlarged in Fig. 10.

In Fig. 10 the block is shown as being substantially rectangular, having a bore 32' to receive pivot pin 33, and is split apart, leaving the block in two pieces, the upper member at each end being provided with a headless set screw 31, whereby the point of each set screw will bear upon the lower member of each split end, so that when the set screws are screwed downwardly, when in operative position, as in Fig. 2, with the block in location as shown, by passing a screw driver through the registering holes 34 located in the upper arm portion 29, the block ends may be expanded to snugly fit the machined slideway, so that during operation, the block will reciprocate at rapid speeds in said slideway, without slap or noise and with a minimum of friction. This means can also be utilized for adjustment for wear. By this construction a noiseless, sound absorbing, adjustable crank pin slide bearing is formed, which is easily replaceable, when required.

The outer end of the arm 22 is developed into a transverse, integral formation in the form of a substantially crescent-shaped, two-ended feed arm support 28, the outer ends of which, at Fig. 1, and by means of studs 37, pivotally support a pair of right-angled cam vibrated film feeding brackets 35—36.

The rearward ends of the arms 35—36 are bent upwardly at right angles to the said arms, as at 42—42, Figs. 1, 3 and 4, to form outstanding, flexible extensions upon the ends of which are integrally mounted, bent over clips 44—44 between which are suitably held, and affixed opposed felt bearing plugs 43—43, the inner faces of which, when in operative positions, Figs. 1 and 4, firmly grip the opposite faces of the thin cams 18 and 18'.

When the cams are operated, as will be later described, the plugs 43—43, which may be oil soaked, form operative contact means for operating the arms 35—36 in a frictionless and absolutely noiseless manner, at any speed of operation.

The other, angled ends 38—38 of the arms 35—36 may be bent up at right angles to form film engaging members such as the film gripping claws 39—39, Figs. 2 and 3, the outer edges thereof being formed into a series of spaced teeth 40, which are pitched, in spacing, to fit the standard sprocket holes in a film F, Figs. 1, 2 and 4.

An alternate form of film feeding claw means may be utilized, wherein, as in Fig. 9, the arms 38—38 may have upturned, right angled extensions 39', to which are slidably mounted a reciprocal toothed member 39'', having film sprocket hole engaging teeth 40, on its forward, outer end, the member 39'' having an extension 47' between which and the arm 38 is attached a spring. In the event of misframing of the film, during operation, this latter construction permits the claw member 39'' to move backwardly, when it does not register with the sprocket holes, and causes it to engage in the sprocket holes, automatically, as the claw moves downwardly, during feeding motion, and thus feed the film.

Fig. 2, shows the usual film sprockets 60 and 61, film guideway 63, and film gate 64. The lower portion of the guideway, in the present instance, however, is curved as 65, to suit the radial movement of the teeth portion of the pivoted rocker-arm 22. The lower portion of the gate is also curved, as 65' for the same reason. Suitable slots 66 and 67 are formed in the curved portion of the gate and slots 68—69 formed in the lower curved guideway, also shown in Fig. 8 admit the entrance of the teeth 40 of the film feeding claw members, to the feed holes of the film. In detail, the slots 68—69 are sufficiently wide, to permit of the swinging or radial action of the teeth 40—40, upon their pivots 37—37 as they operate, normally to feed and release the film F.

Operating parts of this mechanism are thus, always in constant contact, and are so insulated with shock absorbing, non-conducting, sound proof material, that a change in alternate operative or vibrative direction of any part, cannot cause an audible sound.

In operation, the crank shaft 10, turning in the direction indicated by the arrow D, Fig. 2, will cause the rocker arm 22 to be moved upwardly at its fork-ends 29, by the turning action of the crank 33, through a belt driven pulley G, Fig. 1 or other drive means, and the sliding of the block 30, and to move downwardly at its film feeding end 28.

The feeding end 28, it will be noted carries the film feeding claw members, which engage the film sprocket holes at commencement of the down stroke through the slots 66—67 and 68—69 of the film guides, best shown in Fig. 8, and thereby cause the film F to be moved downward a predetermined distance, controlled by the crank arm throw.

At the end of the upward movement of the fork-arms 29, the crank shaft has been turned a distance sufficient to bring the cam surfaces 19, of the cam plates 18—18', into engagement with the arms 42—42 to turn them outward, and thereby retract them, as shown in Fig. 4, thereby withdrawing the teeth 40 from the film F. Continued rotation of the crank shaft 10 will cause the film feeding claws 39—39 to move upwardly, retracted, and cam surfaces 19, of the cam plates 18—18' cause reengagement, by reentry of the teeth 40 with the film, and thus upon the down stroke of the teeth 40, again feed the film.

Thus, it will be noted that I have devised a single drive film feed, operative to cause a dual feeding mechanism to oscillate in, preferably, a vertical direction for alternate film feed and stop motion, and to operate in timed relation therewith a horizontally vibrating film engaging device, both the oscillation and vibration of the timed members acting to engage, pull down and disengage a film, and then return to the re-engaging position in a rapid noiseless manner.

Having thus described my invention, what I claim is:

1. A film feeding means comprising a frame, a single driving means mounted for rotation therein, a single oscillating means mounted on said frame to be oscillated by said driving means, said oscillating means having a pair of oppositely mounted film engaging claw members pivotally mounted thereon, dual cam means on said drive member, and means on said film feeding claws to cooperate with said dual cam means whereby to cause said claws to be oscillated and vibrated into engagement with the film when the oscillating means is moving in one direction.

2. A film feeding mechanism comprising a frame, bearings in said frame and a rotatable crank shaft mounted in said bearings, said bearings being provided with adjustable soundproof non-metallic bushings therein, a reciprocating member mounted in said frame comprising a yoke-like member having guideways, an adjustable bearing block in said guideways and connected to said crank arm, said block being non-metallic, means in said block for adjusting the same to fit said guideways, means carried by said reciprocating member and mounting a pair of vibratable film engaging jaws thereon whereby to engage and disengage a film, said vibrating jaws having cam engaging ends thereon, said ends being provided with felt cam engaging means, and cams for engagement therewith and mounted upon and driven by said crank shaft.

3. A film feeding mechanism comprising a frame, bearings in said frame and a rotatable crank shaft mounted in said bearings, said bearings being provided with adjustable soundproof non-metallic bushings therein, a reciprocating member mounted in said frame comprising a split yoke-like member having parallel guideways, an adjustable bearing block in said guideways and connected to said crank arm, said block being non-metallic, means in said block for adjusting the same to fit said guideways, means carried by said reciprocating member and mounting a pair of vibratable film engaging jaws thereon whereby to engage and disengage a film, said vibrating jaws having cam engaging ends thereon, said ends being provided with felt cam engaging means, and cams for engagement therewith and mounted upon said crank shaft, said cams comprising offset thin disks engaged between a pair of cam forming members which hold and drive the thin disks in operative timed relation with the reciprocating member.

4. A film feeding means comprising a frame, a driving means mounted on said frame for rotation therein, an oscillating means mounted to be radially oscillated by said driving means, said oscillating means having a pair of film engaging claw members pivoted thereon for movement relative thereto, cam means on said driving means, and means on said film feeding claw members to cooperate with said cam means whereby to cause said claw members to be oscillated and vibrated to feed a film, and a film gate associated with said mechanism, a portion of said film gate being curved to a radius, said radius taken from the center of oscillation of said oscillating means.

5. In combination, a single reciprocatory feed member; a pair of separated film-engaging members separately pivotally mounted on said feed member for movement relative thereto; a film guide; and means to reciprocate the film-engaging members into engagement with a film in the guide when said feed member is moving in film feeding direction.

6. In combination, a movable member having a crank; a rocking feed member having a motive arm formed with longitudinal parallel inner faces forming opposed guide ways, one or more of said guide ways having openings therethrough; a bearing block received between said guide ways and having a bore therethrough receiving the crank to rock the rocking member, said block being longitudinally split; perforations passed through said block and registerable with said opening; screws in said perforations for adjusting the block against the guideways; a film-engaging means; and means co-operating with said movable and feed members and film-engaging means for feeding film as said rocking member rocks.

7. A film feeding device comprising in combination with a revolvable shaft having thereon a crank, and a fixed pivot, a rocker mounted on said pivot and slidably engaging said crank at one of its ends for movement in opposite directions during revolution of said shafts, pivots carried by the opposite end of said rocker, film feed brackets mounted on said latter pivots, inner arms carried by said brackets for engaging a film in feeding relation during movement of said rocker in one of the aforesaid directions, outer arms carried by said rocker and having spaced terminals, means for controlling the pivotal movement of said brackets, said means including cams mounted on said shaft, and annular cam discs carried by said cams and having portions disposed on different planes, the peripheral margins of said discs being disposed between and loosely engaging the spaced terminals of said respective outer arms.

8. In a film feeding apparatus comprising a pivoted member and a revolvable shaft having a crank for pivotally moving said member, which latter is provided with spaced legs, said one of said legs having spaced apertures therein, a sound deadening device having a section partly engaging said crank between said legs, another section also partly engaging said crank between said legs, said sections having also therein apertures, and fastening elements movable through said first apertures and engageable in said second apertures for holding said sections engaged during revolutions of the crank, said sections being slidable between said legs.

JOHN LIVINGSTON SPENCE, Jr.